US010372388B2

(12) United States Patent
Katano et al.

(10) Patent No.: US 10,372,388 B2
(45) Date of Patent: Aug. 6, 2019

(54) COMMUNICATION SYSTEM, COMMUNICATION DEVICE, AND CONTROL METHOD

(71) Applicant: CANON KABUSHIKI KAISHA, Tokyo (JP)

(72) Inventors: Akiko Katano, Kawasaki (JP); Mitsuru Konji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/473,080

(22) Filed: Mar. 29, 2017

(65) Prior Publication Data

US 2017/0286021 A1 Oct. 5, 2017

(30) Foreign Application Priority Data

Mar. 31, 2016 (JP) .................................. 2016-072784
Feb. 13, 2017 (JP) .................................. 2017-024415

(51) Int. Cl.
*H04W 4/80* (2018.01)
*G06F 3/12* (2006.01)

(52) U.S. Cl.
CPC ............ *G06F 3/121* (2013.01); *G06F 3/1204* (2013.01); *G06F 3/1236* (2013.01); *G06F 3/1292* (2013.01); *H04W 4/80* (2018.02)

(58) Field of Classification Search
CPC .................................................. H04W 4/008
See application file for complete search history.

(56) References Cited

U.S. PATENT DOCUMENTS

| 9,640,061 | B1* | 5/2017 | Klimanis | H04W 76/14 |
| 2013/0237192 | A1* | 9/2013 | Kim | H04W 48/16 |
| | | | | 455/411 |
| 2015/0155746 | A1* | 6/2015 | Mashimo | H04B 5/0037 |
| | | | | 307/104 |
| 2016/0174058 | A1* | 6/2016 | Lindholm | H04W 8/005 |
| | | | | 370/329 |

(Continued)

FOREIGN PATENT DOCUMENTS

| JP | 2010-98717 A | 4/2010 |
| JP | 2014-120804 A | 6/2014 |

(Continued)

*Primary Examiner* — Cindy Trandai
(74) *Attorney, Agent, or Firm* — Canon U.S.A., Inc. IP Division

(57) ABSTRACT

A communication system includes a communication device that communicates with an information processing device. The communication device wirelessly communicates via a first communication format and a second communication format, which is faster than the first communication format. The communication device includes a broadcasting unit that broadcasts advertising information via the first communication format, and a transmission unit that transmits status information relating to a state of the communication device to a certain information processing device via communication established based on a connection request from the certain information processing device, based on the advertising information. The certain information processing device performs notification of information indicating the state of the communication device based on the transmitted status information.

18 Claims, 12 Drawing Sheets

(56) References Cited

U.S. PATENT DOCUMENTS

| | | | |
|---|---|---|---|
| 2016/0182803 A1* | 6/2016 | Song | H04N 1/00209 |
| | | | 348/211.2 |
| 2016/0227351 A1* | 8/2016 | Gu | H04L 61/6022 |
| 2016/0261769 A1* | 9/2016 | Yamada | H04W 76/14 |
| 2016/0350058 A1* | 12/2016 | Zhu | G06F 3/1454 |
| 2016/0371961 A1* | 12/2016 | Narang | H04W 8/005 |
| 2016/0378410 A1* | 12/2016 | Inoue | G06F 3/1236 |
| | | | 358/1.15 |
| 2017/0134609 A1* | 5/2017 | Park | H04N 1/32776 |
| 2017/0215030 A1* | 7/2017 | Choi | H04W 8/005 |
| 2017/0277486 A1* | 9/2017 | Kondo | G06F 3/1204 |
| 2017/0311223 A1* | 10/2017 | Yan | H04W 8/005 |
| 2018/0007499 A1* | 1/2018 | Lee | H04W 4/00 |

FOREIGN PATENT DOCUMENTS

| | | | |
|---|---|---|---|
| JP | 2015-8368 A | 1/2015 | |
| JP | 2015-104595 A | 6/2015 | |
| JP | 2016-100712 A | 5/2016 | |

\* cited by examiner

COMMUNICATION SYSTEM, COMMUNICATION DEVICE, AND CONTROL METHOD

BACKGROUND

Field

The present disclosure relates to a communication system, communication device, and control method.

Description of the Related Art

A communication device such as a printer or the like performs notification of error information on a display screen or the like in a case where an error such as ink shortage, sheet jamming, or the like occurs, to resolve the error state of the communication device. Japanese Patent Laid-Open No. 2010-98717 proposes a method of performing notification of printing status response data including printing statuses such as errors and so forth, in an information processing device that the user has, such as a mobile terminal or the like.

According to the configuration disclosed in Japanese Patent Laid-Open No. 2010-98717, a wireless connection is established by near field communication (NFC), following which the communication is switched to wireless communication capable of high-speed data communication, and a print job is transmitted to the printer. Thereafter, statuses such as errors and the like accompanying the print job are notified to the information processing device by wireless communication of the same standard as transmission of the print job. However, in the configuration where error notification or the like is performed after switching to communication for transmission of a print job, there are cases where the timing of notifying the user is not necessarily convenient.

SUMMARY

A communication system includes at least one communication device that wirelessly communicates via a first communication format and a second communication format, faster than the first communication format and at least one information processing device. The at least one communication device includes a broadcasting unit configured to broadcast advertising information via the first communication format, and a transmission unit configured to transmit status information relating to a state of the at least one communication device to one of the at least one information processing device via communication established based on a connection request, based on the advertising information, from the one of the at least one information processing device. The one of the at least one information processing device performs notification of information indicating the state of the at least one communication device based on the transmitted status information.

A communication system includes at least one communication device that wirelessly communicates via a first communication format and via a second communication format, faster than the first communication format and at least one information processing device. The at least one communication device includes a broadcasting unit configured to broadcast advertising information via the first communication format, and a transmission unit configured to, in a case where the at least one communication device is in a predetermined state, transmit predetermined information via communication established by connection based on a connection request, based on the advertising information, from one of the at least one information processing device. The one of the at least one information processing device performs notification of information indicating the predetermined state of the communication device based on the transmitted predetermined information.

A communication device that communicates with at least one information processing device and wirelessly communicates via a first communication format and a second communication format, which is faster than the first communication format. The communication device includes a broadcasting unit configured to broadcast advertising information via the first communication format, and a transmission unit configured to transmit status information relating to a state of the communication device to a certain information processing device, via communication established based on a connection request, based on the advertising information, from the certain information processing device.

A control method of an information processing device that communicates with at least one communication device and wirelessly communicates via a first communication format and a second communication format, which is faster than the first communication format, includes transmitting a connection request to the at least one communication device based on advertising information broadcast from the at least one communication device by the first communication format, receiving status information relating to a state of the at least one communication device by communication established via a connection in response to the connection request, and performing notification of the state of the at least one communication device based on the status information.

Further features will become apparent from the following description of exemplary embodiments with reference to the attached drawings.

DESCRIPTION OF THE EMBODIMENTS

Embodiments will be exemplarily described below, with reference to the drawings. It should be understood that one having ordinary skill in the art can make various modifications and improvements on the embodiments described below without departing from the spirit and scope of the present disclosure, and that such modifications and improvements are also encompassed by the scope of the present disclosure.

First Embodiment

Description will be made regarding the information processing device and communication device included in the communication system according to the present embodiment. An example of a smartphone is given as the information processing device and an example of a printer is given as the communication device in the present embodiment. Although a smartphone is exemplified as the information processing device in the present embodiment, this is not restrictive, and various devices can be applied, such as a mobile terminal, laptop PC, tablet terminal, personal digital assistant (PDA), digital camera, and so forth. Although a printer is exemplified as the communication device in the present embodiment, this is not restrictive, and various devices can be applied, as long as they are capable of wireless communication with the information processing device. Examples of a printer include an ink-jet printer, full-color laser beam printer, monotone printer, and so forth. The communication device is not restricted to printers, and can be applied to a photocopier, facsimile device, mobile terminal, smartphone, laptop PC, tablet terminal, PDA, digital camera, music player, television set, and so forth. Moreover, the communication device can be applied to a multifunction device that includes multiple functions, such as copying functions, facsimile functions, printing functions, and so forth.

Figure 1:
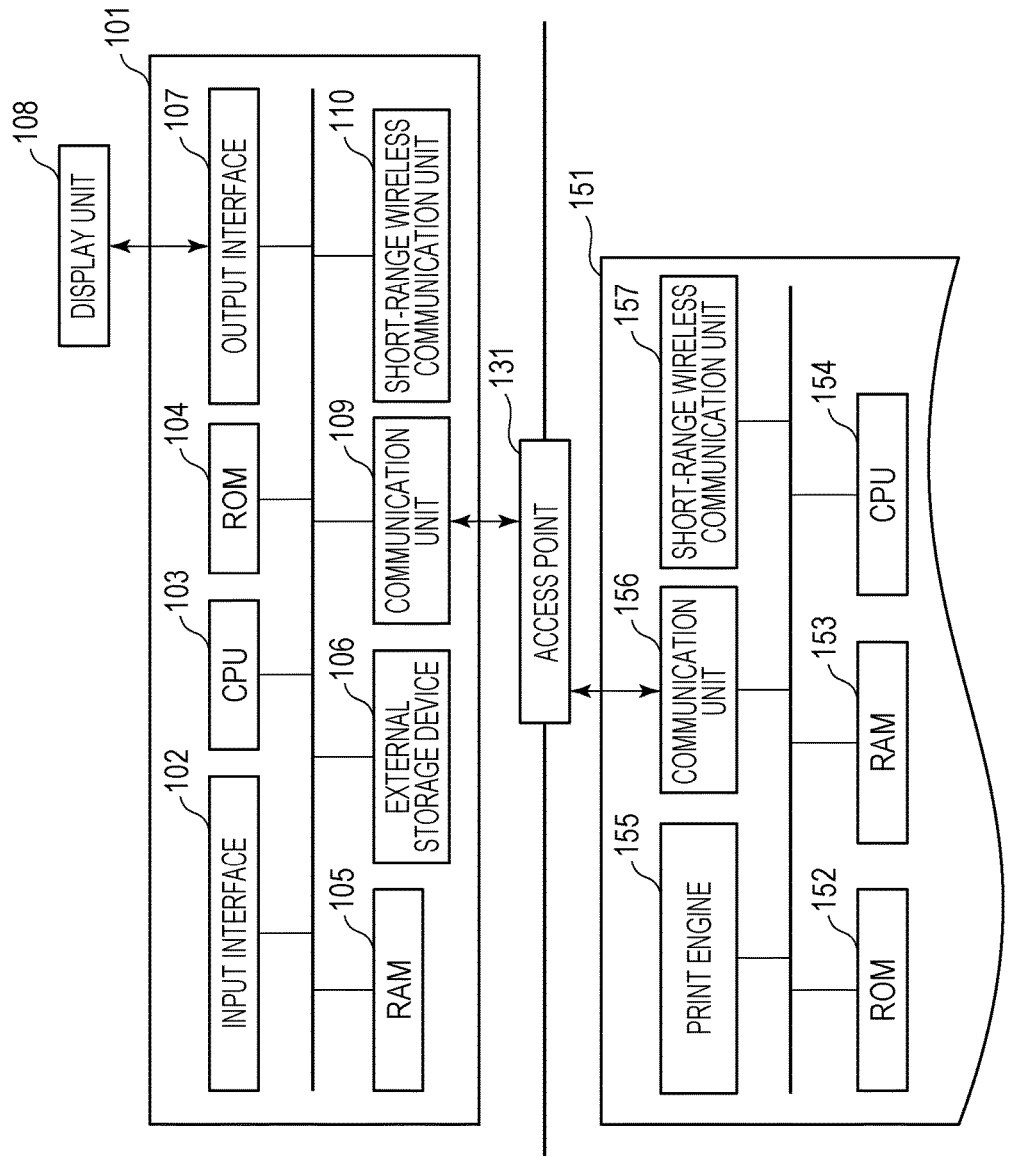
FIG. 1 is an illustrated example of the configuration of an information processing device and communication device according to a first embodiment.

First, the configurations of the information processing device and communication device according the present embodiment will be described with reference to the block diagram illustrated in FIG. 1. Although description of the present embodiment will be made by way of the configuration exemplified in FIG. 1, the devices are not restricted to the functions illustrated here.

An information processing device 101 includes an input interface 102, a central processing unit (CPU) 103, read-only memory (ROM) 104, random access memory (RAM) 105, external storage 106 an output interface 107, a display unit 108, a communication unit 109, a short-range wireless communication unit 110, and so forth. Note that these are connected to each other via a system bus.

The input interface 102 is an interface that accepts data input and operation instructions from a user, via an operating unit (omitted from illustration) such as physical keys or buttons, a touch panel, or the like. At least part of the operating unit and the below-described display unit 108 can be integrated, so that, for example, output from a screen and accepting operations from the user are performed on the same screen. The CPU 103 is a system control unit. The CPU 103 controls the overall information processing device 101 by executing programs and activating hardware. The ROM 104 stores fixed data, such as control programs executed by the CPU 103, data tables, embedded operating system (OS) programs, and so forth. The control programs stored in the ROM 104 in the present embodiment perform software execution control such as, for example, scheduling, task switching, interrupt processing, and so forth, under control of the embedded OS stored in the ROM 104.

The RAM 105 is made up of static RAM (SRAM) that needs a backup power source, dynamic RAM (DRAM), or the like. The data in the RAM 105 can be kept by a primary battery for data backup, which is omitted from illustration. In this case, the RAM 105 can store important data such as program control variables and the like, in a non-volatile manner. A memory area for storing settings information of the information processing device 101 and management data and the like of the information processing device 101 is also provided to the RAM 105. The RAM 105 is also used as main memory and work memory for the CPU 103.

The external storage 106 stores applications that provide printing execution functions, print information generating programs that generate print information interpretable by a communication device 151, and so forth. The external storage 106 also stores various types of programs such as information transmission/reception control programs for transmission/reception with the communication device 151 connected via the communication unit 109, and various types of information used by these programs.

The output interface 107 is an interface that performs control so that the display unit 108 can display data and provide notification regarding the state of the information processing device 101. The display unit 108 includes light-emitting diodes (LED), a liquid crystal display (LCD), or the like, and displays data and performs notification of the state of the information processing device 101. A soft keyboard including numeric input keys, mode setting keys, an OK key, a cancel key, a power key, and so forth, can be provided on the display unit 108 to enable user input to be accepted via the display unit 108.

The communication unit 109 is a configuration that connects to an external device, such as the communication device 151 or the like, to execute data communication. The communication unit 109 can connect to an access point (omitted from illustration) within the communication device 151, for example, thereby enabling communication between the information processing device 101 and the communication device 151. The communication unit 109 can directly communicate with the communication device 151 by wireless communication, or can communicate via an external access point that exists external t0 the information processing device 101 and the communication device 151 (access point 131). Examples of wireless communication include Wireless Fidelity (Wi-Fi®, Bluetooth®, and so forth. Examples of the access point 131 include devices such as a wireless local area network (LAN) router and so forth. In the present embodiment, an arrangement where the information processing device 101 and communication device 151 directly connect without going through an external access point will be referred to as "direct connection", and an arrangement where the information processing device 101 and communication device 151 connect via an external access point will be referred to as "infrastructure connection".

The short-range wireless communication unit 110 is a configuration that wirelessly connects to devices such as the communication device 151 and so forth at close distance to perform data communication, and performs communication using a different communication format from the communication unit 109. The short-range wireless communication unit 110 is connectable to a short-range wireless communication unit 157 within the communication device 151. Bluetooth® Low Energy is used as the communication format for the short-range wireless communication unit 110 in the present embodiment. That is to say, the short-range wireless communication unit 110 includes a Bluetooth® Low Energy unit. The Bluetooth® Low Energy unit includes a microprocessor that processes wireless communication, and a wireless communication circuit that transmits/receives data by wireless communication. The microprocessor includes RAM and flash memory. The communication format of the short-range wireless communication unit 110 may use near field communication (NFC) or Wi-Fi Aware™, for example.

The communication device 151 includes ROM 152, RAM 153, a CPU 154, a print engine 155, a communication unit 156, the short-range wireless communication unit 157, and so forth. These components are mutually connected via a system bus.

The communication unit 156 includes an access point to connect to external devices, such as the information processing device 101 and so forth, as an access point within the communication device 151. This access point can connect to the communication unit 109 of the information processing device 101. The communication unit 156 can directly communicate with the information processing device 101 by wireless communication, or can communicate via the access point 131. Examples of communication formats include Wi-Fi®, Bluetooth®, and so forth. The communication unit 156 can include hardware to function as an access point, or can be made to operate as an access point by software causing it to function as an access point.

The short-range wireless communication unit 157 is a configuration that wirelessly connects to devices such as the information processing device 101 and so forth at close distance. Bluetooth® Low Energy is used as the communication format of the short-range wireless communication unit 157 in the present embodiment. That is, the short-range wireless communication unit 157 includes a Bluetooth® Low Energy unit. The Bluetooth® Low Energy unit includes a microprocessor that processes wireless communication, and a wireless communication circuit that transmits/receives data by wireless communication. The microprocessor includes RAM and flash memory. The communication format of the short-range wireless communication unit 157 can, for example, use near field communication (NFC) or Wi-Fi Aware™. The RAM 153 is configured using SRAM that requires a backup power source or DRAM, or the like. The data in the RAM 153 is kept by a primary battery (not illustrated) for data backup, and thus can store important data such as program control variables and the like in a non-volatile manner. A memory area for storing settings information of the communication device 151 and management data and the like of the communication device 151 is also provided to the RAM 153. The RAM 153 is also used as main memory and work memory for the CPU 154, and serves as a reception buffer to temporarily save print information received from the information processing device 101 or the like, and to save various types of information.

The ROM 152 stores fixed data, such as control programs executed by the CPU 154, data tables, OS programs, and so forth. The control programs stored in the ROM 152 in the present embodiment perform software execution control, such as scheduling, task switching, interrupt processing, and so forth, under control of the embedded OS stored in the ROM 152.

The CPU 154 is a system control unit. The CPU 154 controls the overall communication device 151 by executing programs and activating hardware.

The print engine 155 performs image formation on a recording medium such as paper or the like using a recording agent such as ink or the like, based on information saved in the RAM 153 or a print job received from the information processing device 101 or the like, and outputs printing results. The print job transmitted from the information processing device 101 or the like typically includes a large amount of transmission data, and high-speed communication is required, so reception is performed in the present embodiment via the communication unit 156 that includes higher-speed communication than the short-range wireless communication unit 157.

Memory, such as an external hard disk drive (HDD), a secure digital (SD) card, or the like, can be connected to the communication device 151 as an optional device. Information saved in the communication device 151 can be saved in this memory.

The information processing device 101 operates as a master device in the present embodiment and the communication device 151 operates as a slave device. While an example is described above where the information processing device 101 and communication device 151 share processing, this sharing arrangement is not restrictive, and any other applicable arrangement can be used.

Now, processing for transmitting advertising information and receiving a Bluetooth® Low Energy connection request in the Bluetooth® Low Energy standard will be described. The short-range wireless communication unit 157 operates as a slave device in the present embodiment, so the short-range wireless communication unit 157 performs the above processing.

The short-range wireless communication unit 157 performs communication using GATT communication (Bluetooth® Low Energy communication), where a 2.4 GHz frequency band is divided into 40 channels (channel 0 through 39). Of these, the 37th through 39th channels are used for transmission of advertising information and reception of Bluetooth® Low Energy connection requests, and the 0th through 36th channels are used for data communication following Bluetooth® Low Energy connection.

Figure 2:
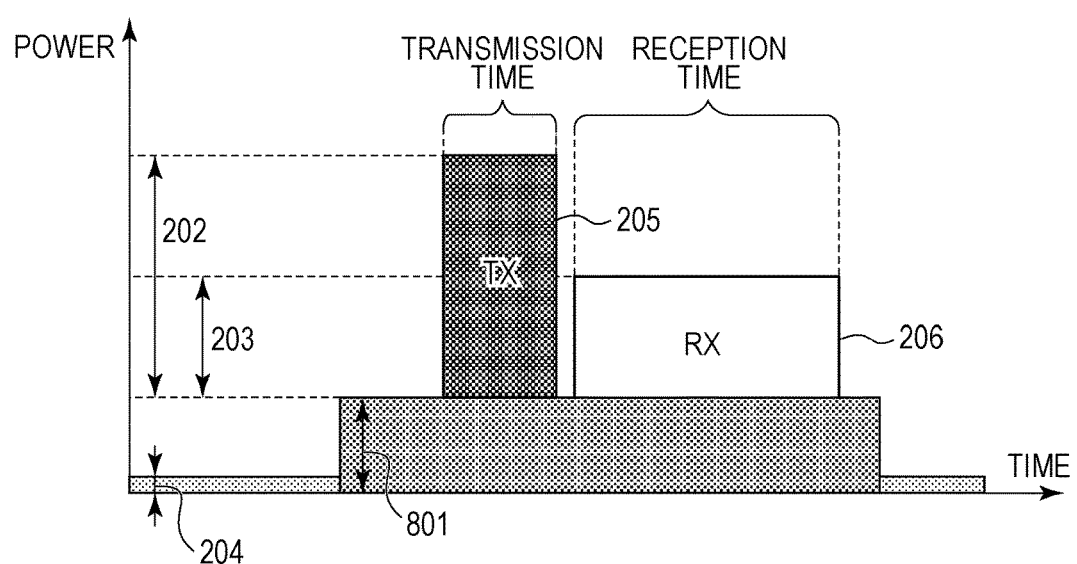
FIG. 2 is a diagram for describing processing of receiving broadcast of advertising information and connection request information.

In FIG. 2, the vertical axis represents the power consumption of the short-range wireless communication unit 157 and the horizontal axis represents time, which illustrates the power consumption for transmitting advertising information using a single channel broken down into processes. Tx205 indicates the total amount of processing power consumed in broadcasting advertising information (hereinafter referred to as "transmission processing"), and Rx206 indicates the total amount of processing power consumed in keeping the receiver enabled to receive Bluetooth® Low Energy connection requests (hereinafter referred to as "reception processing").

Transmission power 202 indicates the peak power consumption by transmission processing. Reception power 203 indicates the peak power consumption by reception processing. Microprocessor operation power 801 indicates the peak power consumption in a case where the microprocessor within the short-range wireless communication unit 157 is operating. The reason that the microprocessor is operating before, after, and during Tx205 and Rx206, is that the microprocessor needs to be active beforehand in order to execute or stop transmission/reception processing. In a case where transmission of advertising information is performed using multiple channels, the power consumption increases proportionately to the number of channels transmitting advertising information.

In a state where the short-range wireless communication unit 157 is in a power saving mode, with the microprocessor not operating, sleep power 204 is the peak power consumption of the short-range wireless communication unit 157. The short-range wireless communication unit 157 thus performs transmission processing using a predetermined channel, and thereafter performs reception processing for a predetermined amount of time using the same channel, awaiting for transmission of a Bluetooth® Low Energy connection request from the information processing device 101.

Figure 3:
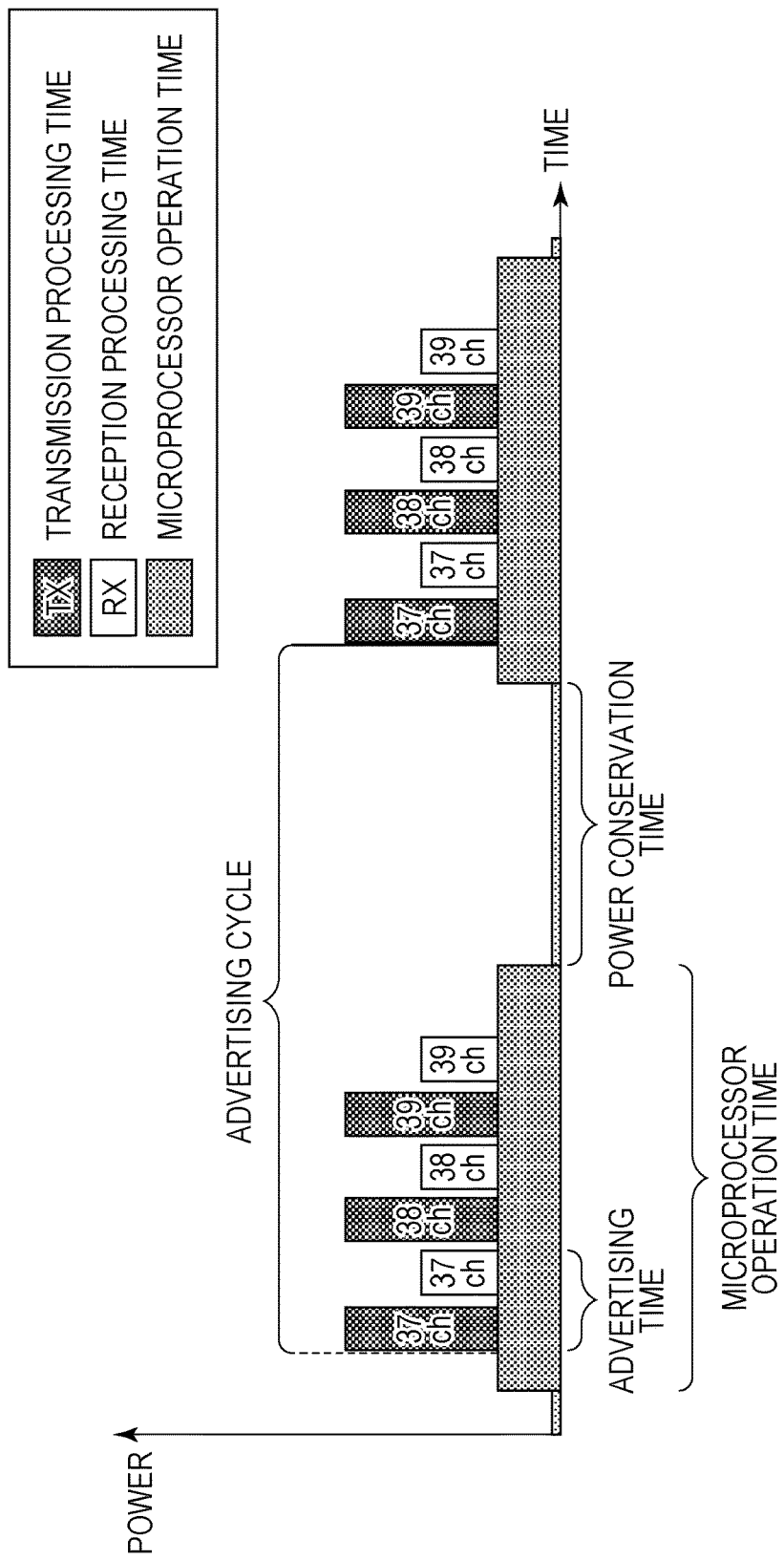
FIG. 3 is a diagram for describing advertisement in Bluetooth® Low Energy.

The short-range wireless communication unit 157 performs advertising information transmission processing and reception processing three times for each channel, and then stops the microprocessor from operating and goes into a power saving state for a predetermined amount of time, as illustrated in FIG. 3. A combination of advertising information transmission processing and reception processing at a predetermined channel will be referred to as an "advertisement", hereinafter. Also, a time cycle of transmitting advertising information at a predetermined channel, i.e., the time cycle from transmitting advertising information on a certain channel until transmitting the advertising information on the same channel the next time, will be referred to as an "advertising cycle". The number of times that advertisement is repeated from the first advertisement until transitioning to the power saving state can be any number that is less than or equal to three.

Figure 4:
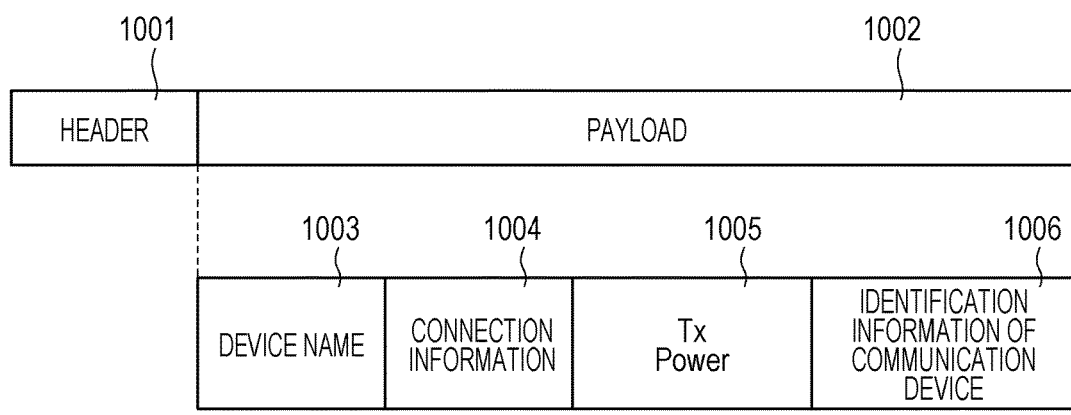
FIG. 4 is a diagram illustrating the structure of advertising information.

FIG. 4 is an example of an advertising information structure that the short-range wireless communication unit 157 broadcasts to the communication device 151. The short-range wireless communication unit 157 performs initialization processing when supply of power is started, and transitions to an advertising state. Once in the advertising state, the short-range wireless communication unit 157 periodically broadcasts advertising information based on an advertising cycle. Advertising information includes signals including basic header information. An example of header information includes identification information or the like for identifying the device transmitting the advertising information. The advertising information (advertising signals) in the present embodiment includes a header 1001 and payload 1002. The header 1001 is a region storing information, such as the type of advertising information, the size of the payload 1002, and so forth.

The payload 1002 stores a device name 1003 serving as identification information of the communication device, implementation profile information of the profile implemented in the communication device, and connection information 1004 for Bluetooth® Low Energy connection with the communication device 151. The payload 1002 stores information such as transmission power (Tx Power) 1005 of the advertising information, and so forth. The payload 1002 according to the present embodiment also includes identification information 1006 of the communication device, the identification information 1006 including error flags. The identification information 1006 of the communication device can also include a media access control (MAC) address of the communication device, service information of the communication device, and so forth. An error flag is information indicating whether some sort of error has occurred at the communication device 151. Error flags can also be stored in regions other than the identification information 1006.

Next, processing for displaying error information of the communication device 151 (device status display processing) will be described. When a certain application stored in the ROM 104, external storage 106, or the like is activated, the information processing device 101 preforms device status display processing. A certain application is an application that performs setting of an access point for the communication device 151 to connect to, confirms the state of the communication device 151 and performs notification relating to the status and error information of the device, instructs the communication device 151 to execute processing, and so forth.

Description in the present embodiment will be made by way of an example where the certain application is a printing application that causes the communication device 151 to print image data, document data, and so forth, within the information processing device 101 (hereinafter also referred to as "printing app"). Note that the printing app can have functions other than printing functions and functions of confirming the state of the communication device 151. For example, in a case where the communication device 151 includes a scan function, the printing app can include a function to cause the communication device 151 to scan a document set in the communication device 151, a function to perform other settings of the communication device 151, and so forth.

Figure 5:
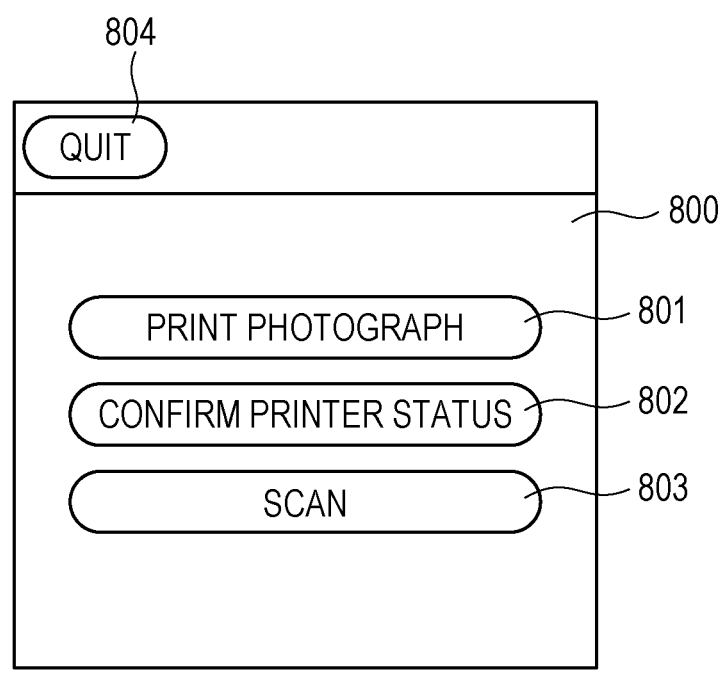
FIG. 5 is an exemplary illustration of a screen at the time of a printing application starting up.

FIG. 5 is an example of a screen displayed on the display unit 108 when the printing app is activated. The user can use an activation screen 800 to use functions of the communication device 151, confirm the status of the communication device 151, and so forth. When one of the objects on the activation screen 800 is selected, the information processing device 101 detects the selection, and executes predetermined processing. The activation screen 800 according to the present embodiment includes a print photograph button 801, a confirm printer status button 802, and a scan button 803 as objects to cause the communication device 151 to execute various types of operations. The activation screen 800 also includes a quit button 804 to quit the printing app.

Upon detecting that the CPU 103 has activated the printing app, the information processing device 101 transitions to a scanning state where advertising information can be received. The activation of the printing app also displays the activation screen 800 on the display unit 108. The timing of transitioning to the scanning state is not restricted to the above. The information processing device 101 can transition to the scanning state where advertising information can be received upon detecting predetermined operations on the activation screen 800 (e.g., pressing the button 802 to confirm the status of the communication device 151) displayed on the display unit 108.

In the following description, the communication device 151 is presumed to be an advertiser that transmits advertising information at predetermined cycles. In addition, the information processing device 101 is presumed to be a scanner that awaits advertising information transmitted from advertisers.

First, the short-range wireless communication unit 157 performs transmission of advertising information. The information processing device 101 receives this advertising information, and thus can recognize the presence of the communication device 151. Upon detecting that the short-range wireless communication unit 110 has received the advertising information, the CPU 103 starts display processing of the device status.

Figure 7:
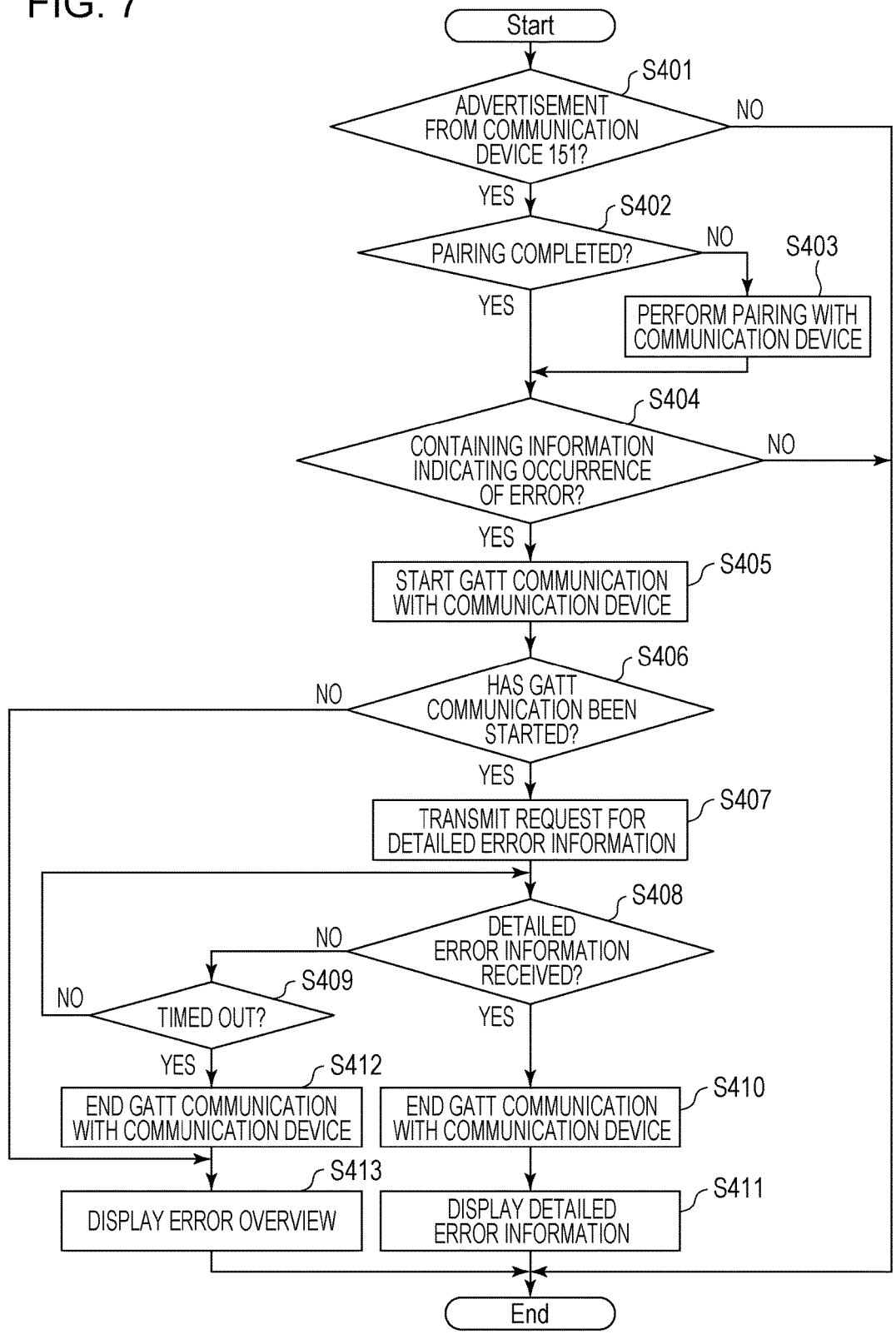
FIG. 7 is a flowchart illustrating processing that an information processing device according to the first embodiment executes.

FIG. 7 is a flowchart illustrating the flow of display processing of the device status of the communication device 151, performed when the information processing device 101 receives advertising information from the communication device 151. The flowchart illustrated in FIG. 7 is realized by, for example, the CPU 103 reading out a program stored in memory, such as the ROM 104, external storage 106, or the like, to the RAM 105 and executing the program.

First, in S401, the CPU 103 determines whether advertising information that has been received is advertising information transmitted from the short-range wireless communication unit 157 of the communication device 151. Specifically, the CPU 103 determines whether the short-range wireless communication unit 110 has received advertising information, and whether identification information indicating the communication device 151 is included in the received advertising information.

In a case of the CPU 103 determining that the short-range wireless communication unit 110 has received advertising information, the flow advances to S402. In a case of the CPU 103 determining that the short-range wireless communication unit 110 has not received advertising information, the flow ends.

In S402, the CPU 103 determines whether the information processing device 101 has previously paired with the communication device 151. In a case where the CPU 103 determines that pairing with the communication device 151 has previously been performed, the flow advances to S404. In a case where the CPU 103 determines that pairing with the communication device 151 has not been performed, the flow advances to S403, pairing with the communication device 151 is performed, and the flow advances to S404. The pairing processing will be described below.

In S404, the CPU 103 determines whether information indicating that an error has occurred at the communication device 151 is included in the received advertising information. Specifically, the CPU 103 determines whether an error flag is included in the advertising information, and if so, whether the error flag is set to a value indicating that an error has occurred.

In a case of the CPU 103 determining that an error has occurred at the communication device 151, the flow advances to S405. In a case where the CPU 103 determines that no error has occurred at the communication device 151, the flow ends.

In S405, processing of GATT communication is started based on the received advertising information. Specifically, the CPU 103 transmits a start request for GATT communication to the communication device 151 based on the received advertising information. Upon the communication device 151 accepting the GATT communication start request, GATT communication between the communication device 151 and the information processing device 101 is started. In GATT communication according to the Bluetooth® Low Energy standard, bi-directional communication between devices is enabled by one device acting as a master and the other device acting as a slave. In the present embodiment, the communication device 151 serves as the slave and the information processing device 101 serves as the master.

In S406, the CPU 103 determines whether GATT communication with the communication device 151 has started. In a case where the CPU 103 determines that GATT communication with the communication device 151 has started, the flow advances to S407. In a case where the CPU 103 determines in S406 that GATT communication with the communication device 151 has not started, the flow advances to S413, and then ends.

Figure 8A:
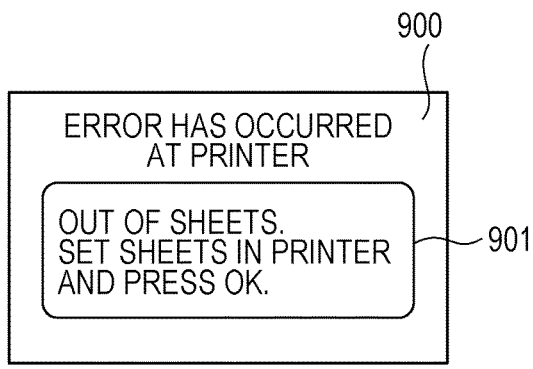
FIGS. 8A and 8B are exemplary illustrations of an information display screen of the printing application.
Figure 8B:

In S413, the CPU 103 has only acquired information from the advertising information to the effect that an error has occurred at the communication device 151, so only an error overview display such as illustrated in FIG. 8B is performed on the display screen of the printing app displayed on the display unit 108. In the error overview display, only notification that some sort of error has occurred at the communication device 151 is displayed in a display region. Alternatively, an arrangement can be made where the CPU 103 quits the flow without notifying the user.

In S407, the CPU 103 transmits a request for detailed error information to the communication device 151 by GATT communication. Next, in S408, the CPU 103 determines whether the short-range wireless communication unit 110 has received detailed error information transmitted from the short-range wireless communication unit 157 of the communication device 151 by GATT communication. In a case of the CPU 103 determining that the short-range wireless communication unit 110 has received the detailed error information, the flow advances to S410.

In S410, the CPU 103 ends GATT communication with the communication device 151. Next, in S411, the CPU 103 displays a detailed error display such as illustrated in FIG. 8A on the display screen of the printing app displayed on the display unit 108. The detailed error display performs display on a display area 900 to the effect that an error has occurred at the communication device 151, and detailed display of the error type on a display area 901, based on the detailed error information acquired by GATT communication, in the display area 900 that makes display to the effect that an error has occurred at the communication device 151. For example, the type of error and method for recovering from the error are notified, and the flow of processing to display of device information ends.

In a case where the CPU 103 determines that the short-range wireless communication unit 110 has not received detailed error information in S408, the flow advances to S409, and determination is made whether a predetermined amount of time has elapsed (timed out) since the connection setting processing started. In a case where no error has occurred at the communication device 151, no detailed error information is transmitted from the communication device 151, so the result of S408 is "No". In a case where the CPU 103 determines that the flow has not timed out S408 is repeated. In a case where the CPU 103 determines that the flow has timed out, the GATT communication with the communication device 151 is ended in S412. The CPU 103 has only acquired information to the effect that an error has occurred at the communication device 151, so an error overview display is made in S413, and the flow ends. Alternatively, an arrangement can be made where the CPU 103 ends the flow without providing any notification.

The information processing device 101 and the communication device 151 in the present embodiment perform mutual authentication, and perform pairing processing to realize reading and writing of data by GATT communication. GATT is a profile governing reading and writing (transmission/reception) of information in the Bluetooth® Low Energy standard. GATT communication is communication where the information processing device 101 serves as a GATT client and the communication device 151 serves as a GATT server to read and write information from the information processing device 101 to the communication device 151 using a GATT-based profile.

The communication device 151 is configured such that reading and wiring of information by GATT communication is not permitted in a state where pairing has not been performed between the information processing device 101 and the communication device 151. Thus, a situation can be avoided where, for example, an unpaired information processing device 101 and communication device 151 perform communication, and information held by the communication device 151 is unintentionally acquired by the unpaired information processing device 101.

Pairing processing will now be described in detail. First, in a case where a below-described printing app is activated, and an initial screen (home screen) displayed by the printing app is displayed on the display unit 108, the information processing device 101 starts searching for advertising information including certain device information. Examples of this certain device information include a universally unique identifier (UUID) or media access control (MAC) address or the like of a device (a printer or the like) corresponding to the printing app.

Upon receipt of advertising information including certain device information, the information processing device 101 transmits a Bluetooth® Low Energy connection request (CONNECT_REQ) to the device that transmitted the advertising information (the communication device 151 in this case), and establishes a Bluetooth® Low Energy connection between the devices.

In a case where pairing with the communication device 151 has not yet completed, the information processing device 101 displays a screen on the display unit 108 prompting the user to perform pairing. In a case where the user instructs execution of pairing, the information processing device 101 transmits a pairing request to the communication device 151 using the security manager protocol (SMP). Communication between the devices is performed by SMP until pairing is complete.

Figure 6:
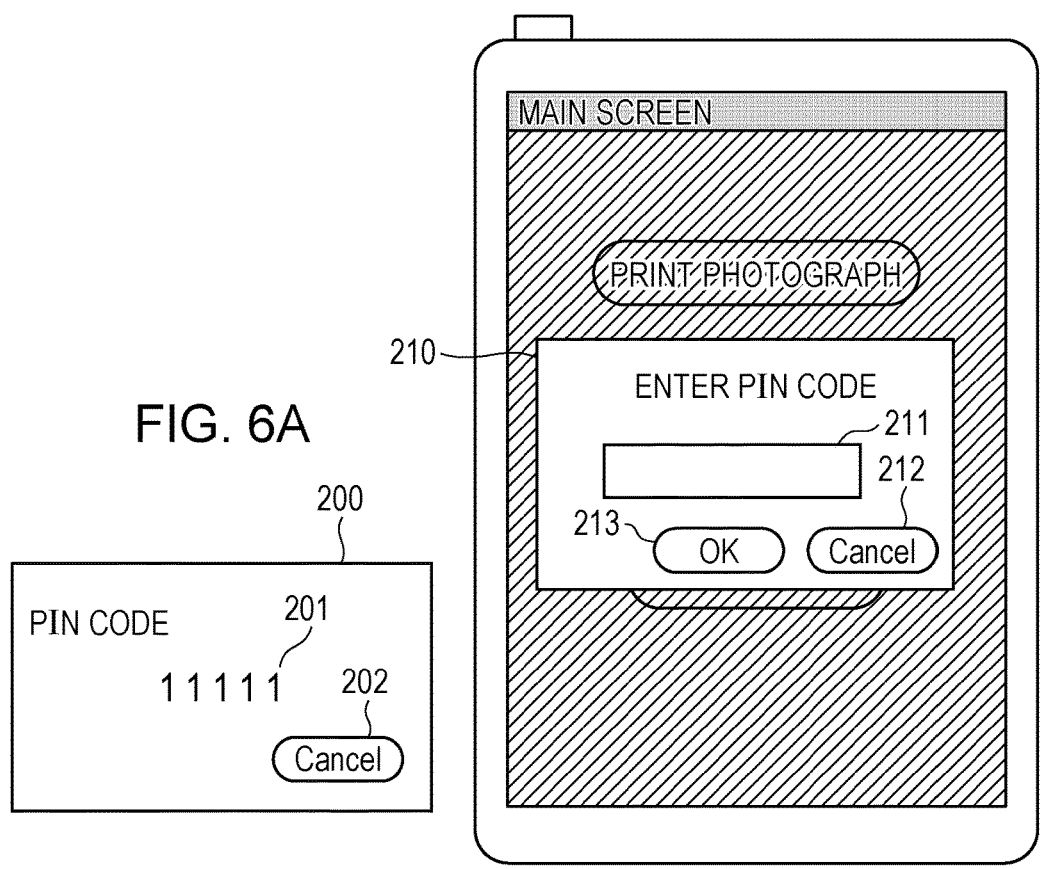
FIGS. 6A and 6B are diagrams illustrating screens during pairing processing.

Upon receipt of the pairing request, the communication device 151 displays a PIN code display screen 200, as illustrated in FIG. 6A, on the display unit. The PIN code display screen 200 displays a PIN code 201 and a cancel button 202 to cancel the pairing processing. Upon transmitting the pairing request, the information processing device 101 displays a PIN code input screen 210, as illustrated in FIG. 6B, on the display unit 108. The PIN code input screen 210 displays a PIN code input region 211 to accept input of the PIN code 201 by the user. The PIN code input screen 210 also displays an OK button 213 to transmit the input PIN code 201 to the communication device 151, and a cancel button 212 to cancel the pairing processing.

When the OK button 213 is pressed in a state where the PIN code 201 is input to the PIN code input region 211, the information processing device 101 transmits information including the input PIN code 201 to the communication device 151. The communication device 151 determines whether the PIN code 201 included in the received information matches the PIN code 201 displayed in the PIN code display screen 200, and if determination is made that these match, permits the information processing device 101 to pair. Specifically, the communication device 151 exchanges a link key created by a predetermined method based on the PIN code 201 with the information processing device 101 using SMP in the Bluetooth® Low Energy standard.

The exchanged link key is stored in each of a storage region of the information processing device 101 (ROM 104 or the like) and a storage region of the communication device 151 (ROM 152 or the like). This completes pairing, and thereafter, execution of Bluetooth® Low Energy communication is permitted among the devices. Once the pairing is completed, the information processing device 101 hides the PIN code display screen 200 from display, and returns to displaying the original screen.

After paring is complete, when the information processing device 101 transmits a GATT communication request to the communication device 151, the link key saved in the storage region at the time of pairing processing is notified to the communication device 151. Upon receipt of a GATT communication request, the communication device 151 compares the link key saved in the storage region at the time of pairing processing with the notified link key, and confirms whether the device transmitting the GATT communication request is a device with which pairing has been completed.

In a case where confirmation has been made that the device has been paired with, the communication device 151 starts reading and writing of information with the information processing device 101 by GATT communication. Accordingly, once pairing processing with the communication device 151 is completed, the information processing device 101 can execute GATT communication with the communication device 151 without the user having to input the PIN code anymore.

While an arrangement has been described above where the user inputs the PIN code 201 displayed in the PIN code input region 211 on the PIN code input screen 210, this arrangement is not restrictive. For example, the PIN code 201 can be fixed, i.e., the user cannot optionally change, information, which is stored in the information processing device 101 at the time of installing the printing app. Thus, the PIN code 201 is notified to the communication device 151 even without user input. The timing of starting the pairing processing is not restricted to the above-described arrangement either, and can be, for example, a timing when the user instructs printing via the printing app or a timing before Bluetooth® Low Energy connection is performed in the connection setting processing, or the like.

Figure 9:
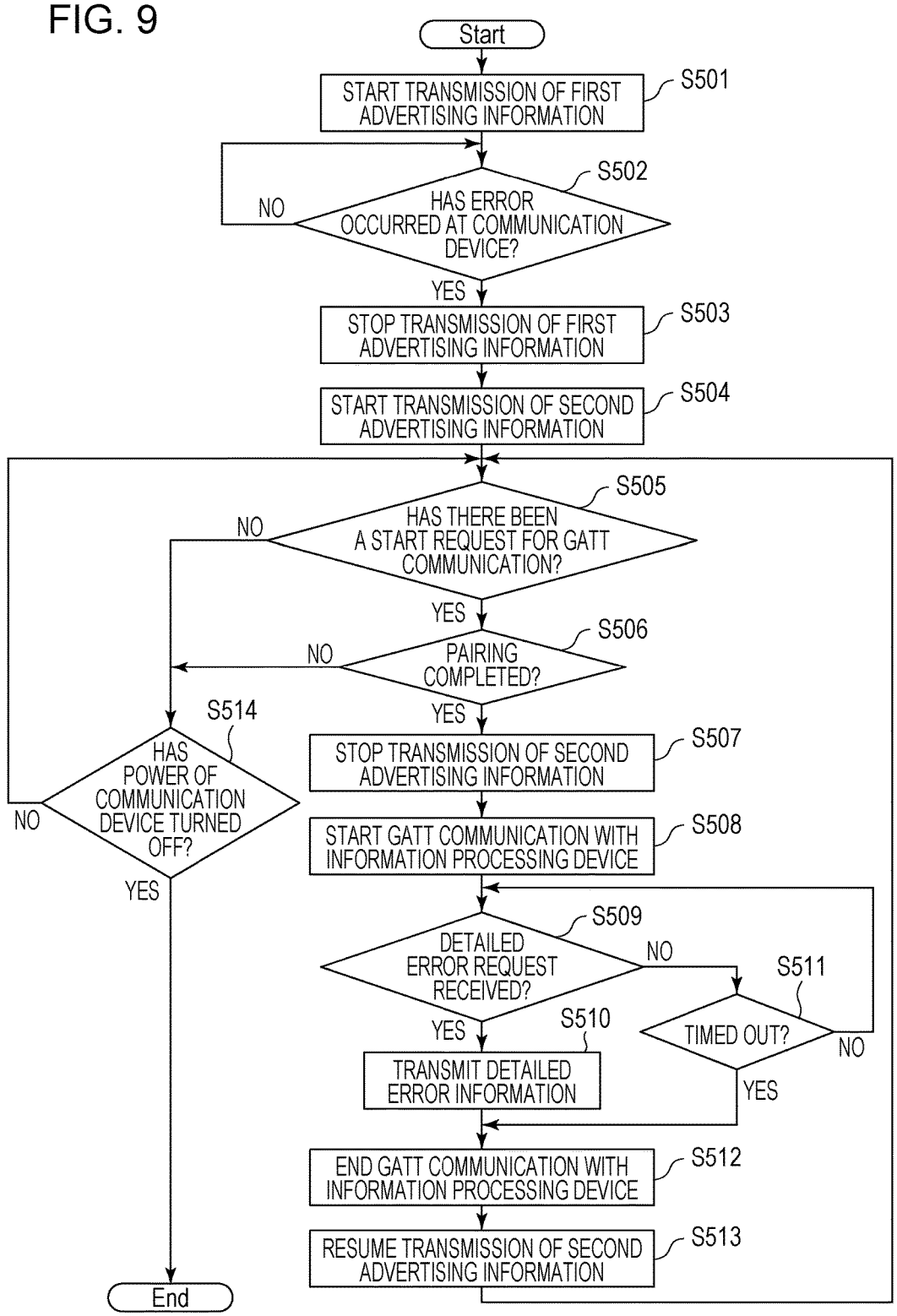
FIG. 9 is a flowchart illustrating processing that a communication device according to the first embodiment executes.

Next, processing that the communication device 151, which is the object of the connection setting processing illustrated in FIG. 2, performs will be described with reference to FIG. 9. FIG. 9 is a flowchart illustrating the flow of processing of information transmission that the communication device 151 performs. The flowchart illustrated in FIG. 9 is realized by, for example, the CPU 154 reading out a program stored in memory, such as the ROM 152 or external storage (omitted from illustration) that the communication device 151 has or the like, to the RAM 153 and executing the program. Assumption will be made that the flowchart illustrated in FIG. 9 is started when the power of the communication device 151 is turned on. Alternatively, the flowchart illustrated in FIG. 9 can, for example, be started where an operation, such as pressing of a predetermined button, provided to the communication device 151 has been detected.

In S501, the CPU 154 starts processing to periodically broadcast first advertising information from the short-range wireless communication unit 157. The term "broadcast" refers to transmitting information over a certain range without specifying a target of the transmission of information. The first transmitted advertising information includes identification information of the communication device 151 and an error flag, where the error flag is set to a value indicating that an error has not occurred.

Next, in S502, the CPU 154 determines whether an error has occurred at the communication device 151. An "error" refers to a state where the communication device 151 cannot execute processing. For example, a state where a recording agent such as ink or the like is running low while executing printing processing, remaining amount of recording medium such as paper or the like is running low, and so forth. In a case where the CPU 154 determines that an error has occurred at the communication device 151, the flow advances to S503. In a case where the CPU 154 determines that an error has not occurred at the communication device 151, S502 is repeated.

In S503, the CPU 154 stops transmitting the first advertising information, and in S504 starts processing to periodically broadcast second advertising information from the short-range wireless communication unit 157. The second advertising information includes device information and an error flag, where the error flag is set to a value indicating that an error has occurred. That is, in the present embodiment the advertising information is switched to the second advertising information in a case where determination is made that an error has occurred.

Next, in S505, the CPU 154 determines whether the short-range wireless communication unit 157 has accepted a start request for GATT communication from the information processing device 101. In a case where the CPU 154 determines that the short-range wireless communication unit 157 has received a start request for GATT communication, the flow advances to S506.

In a case where the CPU 154 determines that the short-range wireless communication unit 157 has not received a start request for GATT communication, the flow advances to S514, where determination is made whether the power of the communication device 151 is going off. Specifically, the CPU 103 determines whether a power button of the communication device 151 has been pressed, and a start command for power off processing has been generated. In a case where the CPU 154 determines that the power of the communication device 151 is not going off, the flow returns to and repeats S505. In a case where the CPU 154 determines that the power of the communication device 151 is going off, advertisement is stopped and the flow ends.

In S506, the CPU 154 determines whether the information processing device 101 that is the transmission source of the start request for GATT communication is a device with which pairing has been completed. In a case where the CPU 154 determines that the information processing device 101 is a device with which pairing has been completed, the flow advances to S507. In a case where the CPU 154 determines that the information processing device 101 is not a device with which pairing has been completed, the flow advances to S514.

In S507, the CPU 154 temporarily stops transmission of the advertising information to perform GATT communication. The CPU 154 then, in S508, resumes GATT communication with the information processing device 101 by the short-range wireless communication unit 157.

Next, in S509, the CPU 154 determines whether a request for detailed error information acquisition has been received by the GATT communication. In a case where the CPU 154 determines that a request for detailed error information acquisition has been received, the flow advances to S510. In a case where the CPU 154 determines that a request for detailed error information acquisition has not been received, the flow advances to S511, where determination is made whether a predetermined amount of time has elapsed (timed out) from start of the GATT communication. In a case of the CPU 103 determining that the process has not timed out, the flow returns to and repeats S509. In a case of the CPU 103 determining that the process has timed out, the flow advances to S512.

In S510, the CPU 154 notifies the information processing device 101 regarding details of the error information of the error occurring at the communication device 151, by GATT communication. In S512, the CPU 154 ends the GATT communication between the information processing device 101 and the communication device 151, and resumes transmission of the second advertising information in S513.

While not illustrated, transmission of advertising information ends at a predetermined timing. Examples of predetermined timing include when the power of the communication device 151 is turned off and when a predetermined amount of time has elapsed after a button is pressed to issue an instruction to start advertising information transmission. Another example is when a predetermined amount of time has elapsed after having transmitted advertising information including an error flag indicating that an error has occurred. In a case where the error has been resolved, the advertising information that the information processing device 101 transmits switches to the first advertising information.

Thus, in the present embodiment, the communication device 151 notifies only whether an error has occurred by advertising information, and notifies detailed information of the error by GATT communication. Accordingly, the detailed status of the communication device can be notified only to the information processing device where a secure connection with the communication device is guaranteed. The reason is that GATT communication is only started with the information processing device 101 that has already been paired. Thus, detailed information of the communication device can be kept from reaching information processing devices where security with the communication device is not ensured and are not suitable for notifying detailed information of the communication device. Accordingly, the security of the communication device can be improved. In addition, pairing is not necessary to acquire whether an error has occurred since this can be acquired by advertisement, so convenience of use of the information processing device for the user can be improved.

That is, broadcasting that an error has occurred by advertising information can prompt users to resolve the error. The information processing device 101 only performs processing of acquiring and displaying error information in a case of detecting the advertising information of the communication device 151, so convenience of the user can be improved.

While description has been made in the present embodiment that the communication device 151 starts transmission of the second advertising information indicating that an error has occurred, after detection that the error has occurred, this is not restrictive. For example, the communication device 151 can be provided with a button or the like to provide an instruction to start transmission of the advertising information, with transmission of advertising information starting after detecting that the user has pressed this button. According to this configuration, error information of the communication device can be transmitted just to a user that wants to reference error information of the communication device via the information processing device 101.

While description has been made in the present embodiment that both the first advertising information and the second advertising information have error flags, with the values of the error flags differing, this is not restrictive. For example, an arrangement can be made where the first advertising information does not include an error flag. Also, a description has been provided that transmission of the first advertising information and the second advertising information is switched, but this is not restrictive. A configuration can be made where the first advertising information is not transmitted, and transmission of the second advertising information, having the error flag set to a value indicating that an error has occurred, is started when detecting that an error has occurred.

Determination that an error has occurred at the communication device 151 can be made at the time of detecting that the button for starting transmission of advertising information has been pressed at the communication device 151, with transmission of the second advertising information starting when determining that an error has occurred. According to these configurations, processing of switching where transmission of the first advertising information is stopped and thereafter transmission of the second advertising information is started does not have to be performed at the communication device 151.

Figure 12:
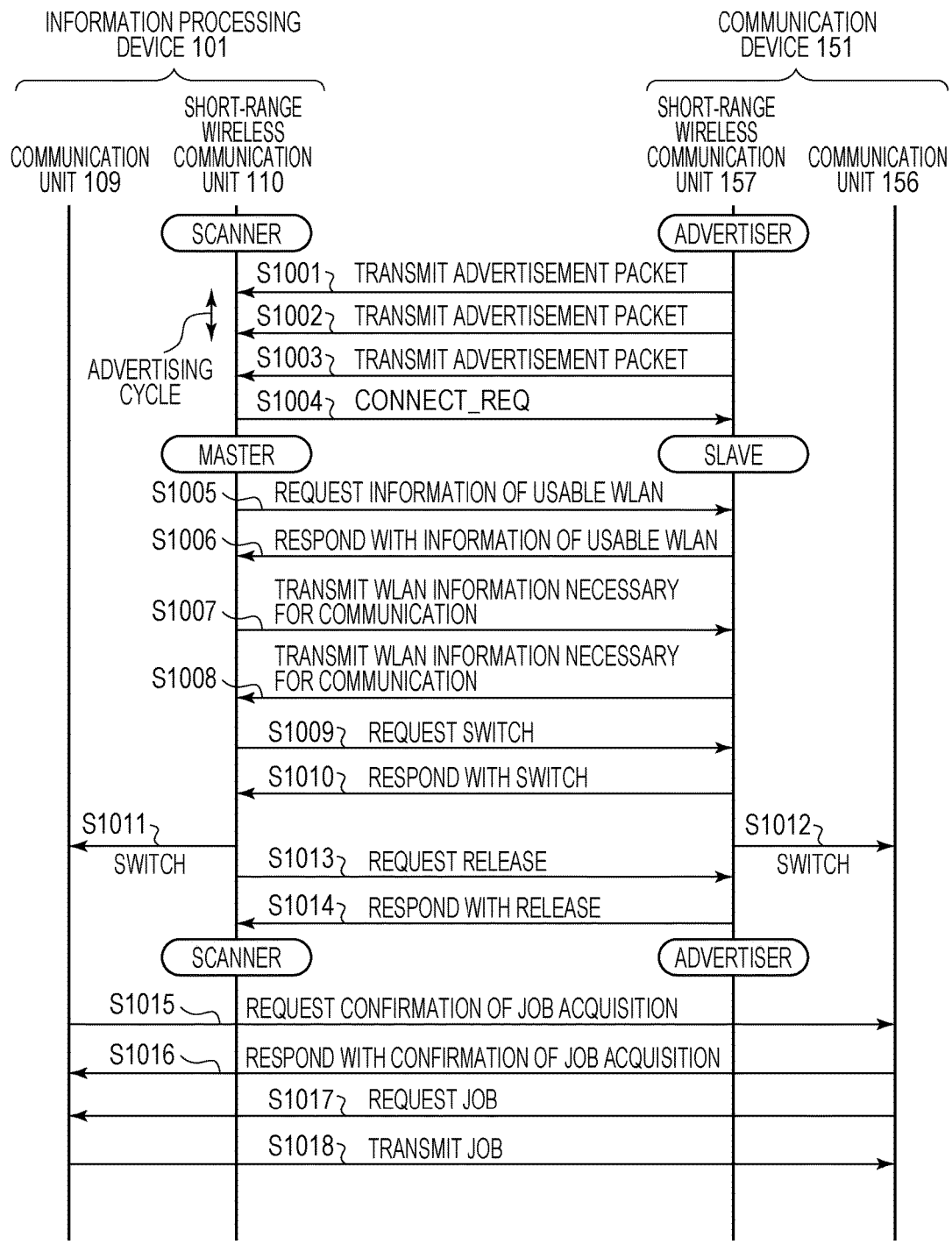
FIG. 12 is a sequence diagram illustrating an information processing device and a communication device performing network connection by Bluetooth® Low Energy communication.

The information processing device 101 and communication device 151 can communicate by Bluetooth® Low Energy communication according other than the process for notifying error information of the communication device 151. FIG. 12 is a sequence diagram illustrating a case of the information processing device 101 and communication device 151 making a network connection by Bluetooth® Low Energy communication. An example of a case of exchanging a job by "handover" will be described with respect to FIG. 12. "Handover" is a technology for devices performing communication by first exchanging connection information for performing high-speed communication by short-range wireless communication, and then switching to high-speed communication to exchange data.

In the present embodiment, Bluetooth® Low Energy is used for short-range wireless communication and Wi-Fi® is used for the high-speed communication that can transmit data faster than the short-range wireless communication. The communication speed of GATT communication (bi-directional communication enabled by establishing a Bluetooth® Low Energy connection between devices) is slower compared to Wi-Fi® communication. Accordingly, GATT communication is used to perform authentication among devices, and exchange connection information of Wi-Fi® communication, and large amounts of data (jobs in this case) are transferred by Wi-Fi® communication or the like where the communication speed is fast. This enables efficient data transfer to be realized. The communication methods used in handover are not restricted to the above form, and that various types of communication formats can be used for short-range wireless communication and high-speed communication. An example configuration is to use NFC or Wi-Fi Aware™ communication to exchange connection information for Wi-Fi® communication, and thereafter use Wi-Fi® communication to exchange data.

The processing of the communication device 151 illustrated in this processing sequence is realized by the CPU 154 loading a control program stored in the ROM 152 or a HDD (omitted from illustration) of the communication device 151, to the RAM 153, and executing the program. Also, the processing of the communication device 151 illustrated in this processing sequence is realized by the CPU 103 loading a control program stored in the ROM 104 or a HDD (omitted from illustration) of the information processing device 101, to the RAM 105, and executing the program.

It will be assumed in the following description that the communication device 151 serves as the advertiser periodically transmitting advertising information. It will also be assumed that the information processing device 101 serves as a scanner awaiting advertising information transmitted from an advertiser. First, the short-range wireless communication unit 157 transmits advertising information (S1001 through S1003). The information processing device 101 recognizes the presence of the communication device 151 by the short-range wireless communication unit 110 receiving advertising information that has been transmitted from the short-range wireless communication unit 157.

Once the information processing device 101 recognizes the communication device 151 and decodes to connect to the communication device 151, the information processing device 101 transmits connection request information to the communication device 151. Specifically, the short-range wireless communication unit 110 transmits a CONNECT_REQ, which is a request to transition to a connection event for establishing a network connection by Bluetooth® Low Energy (S1004).

Upon receipt of the CONNECT_REQ by the short-range wireless communication unit 157, the information processing device 101 and communication device 151 prepare to transition to a connection event. Specifically, the short-range wireless communication unit 110 and short-range wireless communication unit 157 notify the respective CPU 103 and CPU 154 that preparation to transition to a Bluetooth® Low Energy connection event has been completed. Thereafter, the information processing device 101 and communication device 151 respectively transition from scanner and advertiser to master and slave, and the information processing device 101 serving as the master and the communication device 151 serving as the slave establish a Bluetooth® Low Energy connection. A star topology of one master to multiple slaves can be formed in the Bluetooth® Low Energy standard. Once the Bluetooth® Low Energy connection has been established, the information processing device 101 and communication device 151 can perform data communication by GATT communication.

Next, in S1005 the short-range wireless communication unit 110 requests the short-range wireless communication unit 157 for information of a communication protocol that the communication device 151 can use. This request includes information of communication protocols that the information processing device 101 can use, so by receiving this request, the short-range wireless communication unit 157 can recognize that the information processing device 101 can use communication formats such as Wi-Fi® and the like. The short-range wireless communication unit 157 responds, in S1006, to the request received in S1005 with information of communication protocols that it can use itself. Accordingly, both devices can comprehend communication protocols usable with each other, other than Bluetooth® Low Energy.

Now, it will be presumed that the information processing device 101 has decided to switch the communication between the devices to Wi-Fi® communication by comprehending communication protocols usable with each other besides Bluetooth® Low Energy. The communication device 151 can decide whether to switch the communication format at this time. In a case where a decision is made to switch the communication format, in S1007 and S1008 the devices exchange communication information necessary for performing Wi-Fi® communication, such as addresses for identifying the communication partner, information such as service set identifier (SSID), and so forth. Then, in S1009 the short-range wireless communication unit 110 transmits a request to switch the communication format between the devices from GATT communication to Wi-Fi® communication (communication switch request). Upon receiving the switch request, the short-range wireless communication unit 157 responds in S1010.

Once the switch request and response are successfully performed, in S1011 the information processing device 101 switches the communication unit used to communicate with the communication device 151 from the short-range wireless communication unit 110 to the communication unit 109. In S1012, the communication device 151 switches the communication unit used to communicate with the information processing device 101 from the short-range wireless communication unit 157 to the communication unit 156.

After performing the switch, in step S1013, the short-range wireless communication unit 110 transmits a release request. The short-range wireless communication unit 157 that receives the release request transmits a release response in S1014, so the Bluetooth® Low Energy connection between the devices ends. Upon the Bluetooth® Low Energy connection between the devices ending, the information processing device 101 and communication device 151 return to being scanner and advertiser respectively, and the short-range wireless communication unit 157 resumes transmission of advertising information.

Next, the devices use the information necessary to perform Wi-Fi® communication exchanged in S1007 and S1008, and perform Wi-Fi® communication. First, in S1015, the communication unit 109 confirms whether the communication device 151 can acquire a job. Confirmation is made, for example, of information such as available capacity at the communication device 151 to temporarily store the image to be transferred. After receiving the confirmation request, in S1016, the communication unit 156 transmits a response to the confirmation.

In a case where a correct response is obtained and determination is made that the communication device 151 can acquire a job, in S1017, the communication unit 156 requests a job. The communication unit 109 that received the job request then transmits a job including image data or the like present in the information processing device 101 to the communication unit 156 in S1018. Selection of the job to be transmitted is performed at a timing such as, for example, before the Bluetooth® Low Energy connection is established, after the Bluetooth® Low Energy connection is established, after the Wi-Fi® connection is established, or the like.

The job to be transmitted is not restricted to a printing job, and can be, for example, a scan job for instructing the communication device 151 to perform a scan, a job for the information processing device 101 to acquire status information of the communication device 151, or the like. Alternatively, the job to be transmitted can be a command or the like to execute various types of operation at the communication device 151, such as, for example, changing settings of the communication device 151.

Once transmission of the job has been completed, the information processing device 101 cuts off the Wi-Fi® connection with the communication device 151, and returns to the network state immediately before the handover. Specifically, in a case where the information processing device 101 had been connected to, for example, a mobile communication network such as 3G or Long Term Evolution (LTE) or the like, or an access point such as a router or the like, before executing the handover, the connection to the mobile communication network or access point is reestablished. Accordingly, the information processing device 101 stores information of the network state immediately before the handover, communication information necessary for establishing this network information, and so forth, before executing the handover.

The state of the communication device 151 can be notified before switching to high-speed communication for job transmission, such as Wi-Fi® or the like, in the present embodiment. Accordingly, the user can comprehend the state of the communication device 151 at a timing before the Wi-Fi® connection of the information processing device 101 and communication device 151. Using handover technology enables connection information to be exchanged for performing communication at high speed, using communication with excellent usability (short-range wireless communication), and thus, large amounts of data can be exchanged at high speed by high-speed communication.

In a case where handover has been performed in which switching is performed from GATT communication to Wi-Fi® communication, the Bluetooth® Low Energy connection between the devices is cut off, so the short-range wireless communication unit 157 resumes transmission of advertising information.

Second Embodiment

Figure 10:
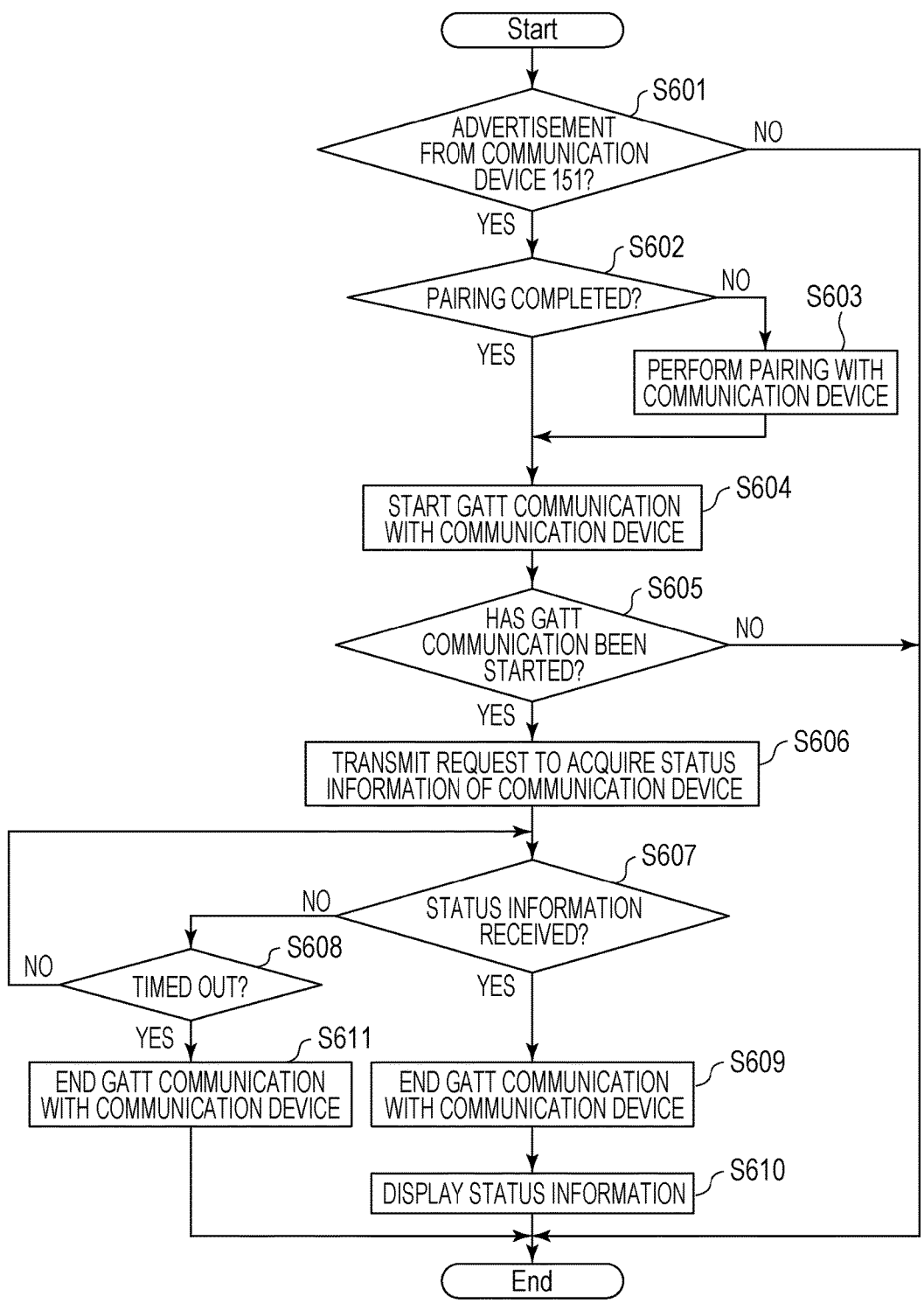
FIG. 10 is a flowchart illustrating processing that an information processing device according to a second embodiment executes.

A second embodiment will now be described. In the present embodiment, all error information is acquired by GATT communication. FIG. 10 is a flowchart illustrating the flow of device status display processing of the communication device 151 that is performed in the present embodiment in a case where the information processing device 101 receives advertising information from the communication device 151. The flowchart illustrated in FIG. 10 is realized by, for example, the CPU 103 reading out a program stored in the ROM 104 or external storage 106 or the like, to the RAM 105 and executing the program. The processing of S601 through S603 is the same as the processing of S401 through S403, so description is omitted herein.

In S604, the CPU 103 transmits a GATT communication start request to the communication device 151, based on the received advertising information. Upon acceptance of the start request for GATT communication by the communication device 151, GATT communication is started between the communication device 151 and the information processing device 101. In GATT communication according to the Bluetooth® Low Energy standard, bi-directional communication between devices is enabled by one device acting as a master and the other device acting as a slave. In the present embodiment, the communication device 151 serves as the slave and the information processing device 101 serves as the master.

In S605, the CPU 103 determines whether GATT communication has started with the communication device 151. In a case where the CPU 103 determines that GATT communication has started with the communication device 151, the flow advances to S606. In a case where the CPU 103 determines in S605 that GATT communication has not started with the communication device 151, the flow ends. In S606, the CPU 103 transmits a status information acquisition request to the communication device 151 by GATT communication.

Next, in S607 the CPU 103 determines whether the short-range wireless communication unit 110 has received the status information transmitted from the short-range wireless communication unit 157 of the communication device 151 by GATT communication. In a case where the CPU 103 determines that the short-range wireless communication unit 110 has received the status information, the flow advances to S609. In a case where the CPU 103 determines that the short-range wireless communication unit 110 has not received the status information, the flow advances to S608, where determination is made regarding whether a predetermined amount of time has elapsed (timed out) after having stated the connection setting processing. In a case of the CPU 103 determining that the process has not timed out, the flow returns to and repeats S607. In a case of the CPU 103 determining that the process has timed out, in S611, GATT communication with the communication device 151 is ended and the flow ends.

In S609, the CPU 103 ends GATT communication with the communication device 151. Then, in S610, the CPU 103 displays status information on the display screen of the printing app. In a case where information relating to an error occurring at the communication device 151 is included in the status information acquired from the communication device 151, the CPU 103 performs a detailed error information display, as illustrated in FIG. 8A, in S610. The detailed error display performs detailed display of the error type on the display area 901, based on the status information received from the communication device 151, in a display area 900 that makes display to the effect that an error has occurred at the communication device 151. The flow then ends. If there is no information relating to an error included, status information does not have to be displayed.

Figure 11:
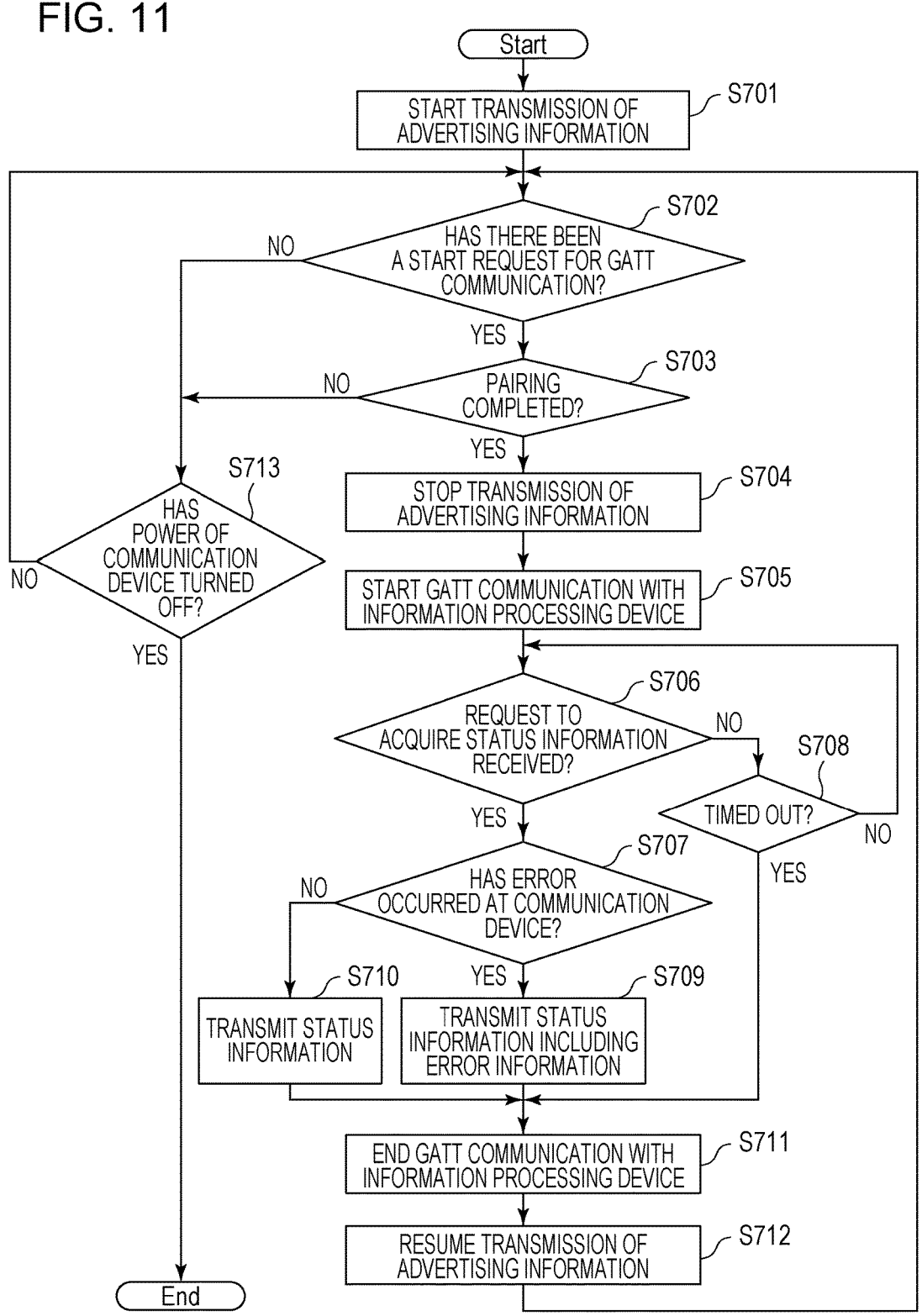
FIG. 11 is a flowchart illustrating processing that a communication device according to the second embodiment executes.

FIG. 11 is a flowchart illustrating the flow of processing for information transmission that the communication device 151 performs in the present embodiment. The flowchart illustrated in FIG. 11 is realized by, for example, the CPU 154 reading out a program stored in memory, such as the ROM 152 or external storage (omitted from illustration) that the communication device 151 includes or the like, to the RAM 153 and executing the program. It will be assumed that the flowchart illustrated in FIG. 11 is started when the power of the communication device 151 is turned on.

In S701, the CPU 154 starts processing to periodically broadcast advertising information from the short-range wireless communication unit 157. The term "broadcast" refers to transmitting information over a certain range, without specifying a target of the transmission of information. Accordingly, in a case where there are multiple information processing devices in the certain range, a certain information processing device of the multiple information processing devices transmits a connection request to the communication device 151 based on the advertising information that has been broadcast. The device information for identifying the communication device 151 is included in the payload 1002 of the transmitted advertising information.

Next, in S702, the CPU 154 determines whether the short-range wireless communication unit 157 has accepted a GATT communication start request from the information processing device 101. In a case of the CPU 154 determining that the short-range wireless communication unit 157 has received a GATT communication start request, the flow advances to S703. In a case of the CPU 154 determining that the short-range wireless communication unit 157 has not received a GATT communication start request, the flow advances to S713, where determination is made whether the power of the communication device 151 has turned off. Specifically, the CPU 154 determines whether a power button of the communication device 151 has been pressed, thereby generating a start command for power off processing. In a case where the CPU 154 determines that the power of the communication device 151 is not going off, the flow returns to and repeats S702. In a case where the CPU 154 determines that the power of the communication device 151 is going off, advertisement is stopped and the flow ends.

In S703, the CPU 154 determines whether the information processing device 101 that is the transmission source of the start request for GATT communication is a device with which pairing has been completed. In a case where the CPU 154 determines that the information processing device 101 is a device with which pairing has been completed, the flow advances to S705. In a case where the CPU 154 determines that the information processing device 101 is not a device with which pairing has been completed, the flow advances to S713.

In S704, the CPU 154 temporarily stops transmission of the advertising information to perform GATT communication. The CPU 154 then, in S705, resumes GATT communication with the information processing device 101 by the short-range wireless communication unit 157.

Next, in S706, the CPU 154 determines whether a request for status information acquisition has been received by GATT communication. In a case of the CPU 154 determining that a request for status information acquisition has been received, the flow advances to S707. In a case of the CPU 154 determining that a request for status information acquisition has not been received, the flow advances to S708, where determination is made that a predetermined amount of time has elapsed (timed out) from the start of GATT communication. In a case where the CPU 154 determines that the process has not timed out, the flow returns to and repeats S706. In a case where the CPU 154 determines that the process has timed out, the flow advances to S711.

In S707, the CPU 154 determines whether an error has occurred at the communication device 151. The processing here is the same as in S502 in the first embodiment. In a case where the CPU 154 determines that an error has occurred at the communication device 151, the flow advances to S709, where status information including error information of the error occurring at the communication device 151 is notified to the information processing device 101 by GATT communication. In a case where the CPU 154 determines that an error has not occurred at the communication device 151, the flow advances to S710, where status information, including information to the effect that no error is occurring, is notified to the information processing device 101 by GATT communication. Status information that does not include error information (information of whether an error is occurring) can be notified.

Subsequently, in S711 the CPU 154 ends the GATT communication between the information processing device 101 and the communication device 151, and in S712 resumes transmission of advertising information.

Thus, the communication device 151 according to the present embodiment notifies whether an error has occurred and detailed information thereof by GATT communication. Accordingly, the communication device 151 does not need to switch advertising information depending on whether there is an error occurring. Thus, processing for switching the advertising information, specifically stopping transmission of advertising information, and generating and starting transmission of advertising information having different information, is unnecessary. Accordingly, even acquisition of details of error information can be speedily performed by GATT communication. GATT communication is only started with the information processing device that has already been paired, so the detailed state of the communication device can be notified only to the information processing device where security of the connection is guaranteed.

While description has been provided in the present embodiment that the communication device 151 starts transmission of the advertising information after detection that the power has turned on, this is not restrictive. For example, the communication device 151 can include a button or the like to provide an instruction to start transmission of the advertising information, with transmission of advertising information starting after detecting that the user has operated this button. According to this configuration, status information of the communication device 151 can be transmitted to an information processing device for just a user that wants to reference via the information processing device 101.

Other Embodiments

While error information has been used in the above-described embodiment as an example of status information, this is not restrictive. Other examples can include information indicating a shipment arrival processing state, information indicating a sleep state, information indicating that recovery process will take time, and other such information and the like. The status information can be information indicating that settings such as sheet settings have been changed, information indicating that a message has been notified to the display unit of the communication device 151, information indicating an impending error, such as ink running low, or the like. An example of a message notified to the communication device 151 is notification of update information, such as "a firmware update is available" or the like.

An error flag indicating whether an error has occurred is not restricted to being transmitted at the time of transmitting advertising information as in the first embodiment, and can be transmitted by GATT communication. Specifically, after starting GATT communication in S508 in FIG. 9, the communication device 151 first transmits flag information indicating whether an error has occurred by GATT communication. The communication device 151 can then transmit status information indicating details of the error by GATT communication in S510, in accordance with an acquisition request for the error details from the information processing device (S606 in FIG. 10), after having transmitted the flag information.

For error notification at the information processing device, notification indicating whether there is an error is first performed based on flag information acquired first, and then, an error information acquisition request is placed in S606 by the information processing device. A notification based on the details of the error can be performed in S610 in accordance with the details of the error thus obtained. Thus, the user can first comprehend whether an error has occurred. In a case where the user wants to know additional details of the error, the user can provide instructions for the information processing device 101 to request details of the error, and thus can comprehend the details of the error and a method to resolve the error.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-072784 filed Mar. 31, 2016 and No. 2017-024415 filed Feb. 13, 2017, which are hereby incorporated by reference herein in their entirety.

What is claimed is:

1. A communication apparatus that communicates with an information processing apparatus and executes predetermined processing using image data, the communication apparatus comprising:
   at least one processor causing the communication apparatus to act as:
   a first communication unit configured to transmit advertising information and communicate with the information processing apparatus via a connection established based on a request from the information processing apparatus that receives the advertising information, based on Bluetooth® Low Energy standard as a first communication standard;
   a second communication unit configured to communicate image data with the information processing apparatus via communication based on a second communication standard which is able to perform higher-speed communication than the Bluetooth® Low Energy standard;
   a first determination unit configured to determine whether the communication apparatus is in a specific state, the communication apparatus not being able to execute the predetermined processing when in the specific state; and
   a second determination unit configured to determine whether an authentication of the information processing apparatus has been performed;
   wherein in a case where the second determination unit determines that the authentication of the information processing apparatus has been performed and in a case where the first determination unit determines that the communication apparatus is in the specific state, the first communication unit transmits specific information based on the specific state, via the connection established based on the request from the information processing apparatus that receives the advertising information based on the Bluetooth® Low Energy standard, and
   wherein in a case where the second determination unit determines that the authentication of the information processing apparatus has not been performed, the first communication unit does not transmit the specific information via the connection established based on the request from the information processing apparatus that receives the advertising information based on the Bluetooth® Low Energy standard, even in the case where the first determination unit determines that the communication apparatus is in the specific state.

2. The communication apparatus according to claim 1,
wherein the first determination unit determines whether the communication apparatus is in an error state as the specific state; and
wherein in the case where the second determination unit determines that the authentication of the information processing apparatus has been performed and in the case where the first determination unit determines that the communication apparatus is in the error state, the first communication unit transmits the specific information indicating an error, via the connection established based on the request from the information processing apparatus that receives the advertising information based on the Bluetooth® Low Energy standard.

3. The communication apparatus according to claim 1,
wherein the first determination unit determines whether the communication apparatus is in an error state as the specific state; and
wherein in the case where the second determination unit determines that the authentication of the information processing apparatus has been performed and in the case where the first determination unit determines that the communication apparatus is in the error state, the first communication unit transmits the specific information indicating details of the error.

4. The communication apparatus according to claim 1, wherein the at least one processor further causes the communication apparatus to act as:
a job acquisition unit that acquires, via the communication based on the second communication standard, information of a job as the predetermined processing to be executed by the communication apparatus.

5. The communication apparatus according to claim 1, wherein the first communication unit transmits information regarding a remaining amount of recording medium in the communication apparatus as the specific information.

6. The communication apparatus according to claim 1, wherein the first communication unit transmits information regarding a sleep state of the communication apparatus as the specific information.

7. The communication apparatus according to claim 1, wherein the first communication unit transmits information regarding a setting state of the communication apparatus as the specific information.

8. The communication apparatus according to claim 1, wherein in the case where the second determination unit determines that the authentication of the information processing apparatus has been performed and in the case where the first determination unit determines that the communication apparatus is in the specific state, the first communication unit transmits the specific information indicating that the communication apparatus is in the specific state that the communication apparatus is not able to execute the predetermined processing, via the connection established based on the request from the information processing apparatus that receives the advertising information based on the Bluetooth® Low Energy standard.

9. The communication apparatus according to claim 1, wherein the first communication unit transmits, via the established connection, communication information for performing communication between the communication apparatus and the information processing apparatus based on the second communication standard.

10. The communication apparatus according to claim 9, wherein before the communication of the image data with the information processing apparatus via the communication based on the second communication standard is executed, the first communication unit transmits the specific information via the connection established based on the request from the information processing apparatus that receives the advertising information based on the Bluetooth® Low Energy standard.

11. The communication apparatus according to claim 9, wherein the second communication unit performs a function as an access point in the communication based on the second communication standard.

12. The communication apparatus according to claim 1, wherein the authentication is executed using key information.

13. The communication apparatus according to claim 1, wherein the authentication is pairing processing.

14. The communication apparatus according to claim 1, wherein the established communication is GATT communication.

15. The communication apparatus according to claim 1, wherein the second communication standard is Wi-Fi®.

16. The communication apparatus according to claim 1, wherein notification based on the specific information is displayed on a display unit of the information processing apparatus.

17. The communication apparatus according to claim 1, wherein the communication apparatus is a printing device.

18. The communication apparatus according to claim 1, wherein the communication apparatus is a camera.

* * * * *